(No Model.)
E. THOMSON.
ELECTRIC MOTOR.
No. 555,191. Patented Feb. 25, 1896.
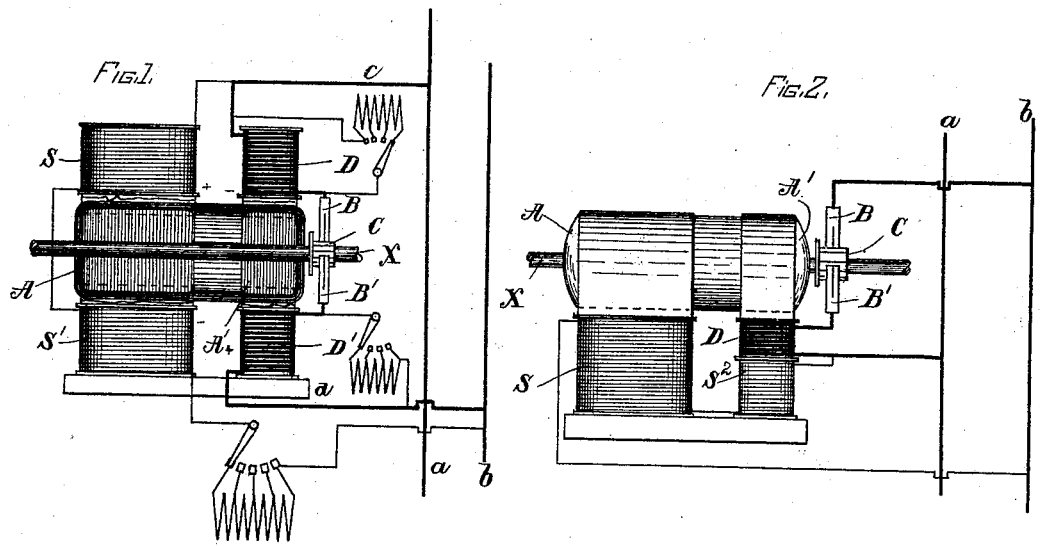
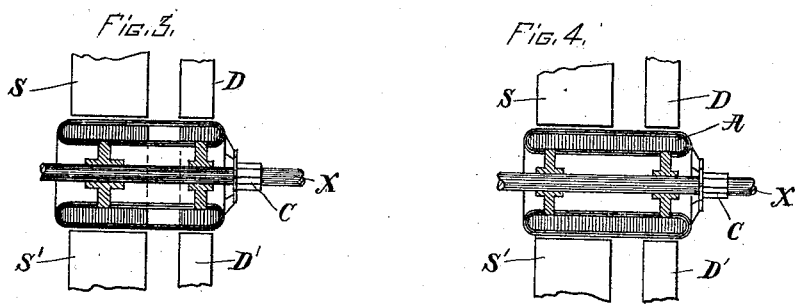
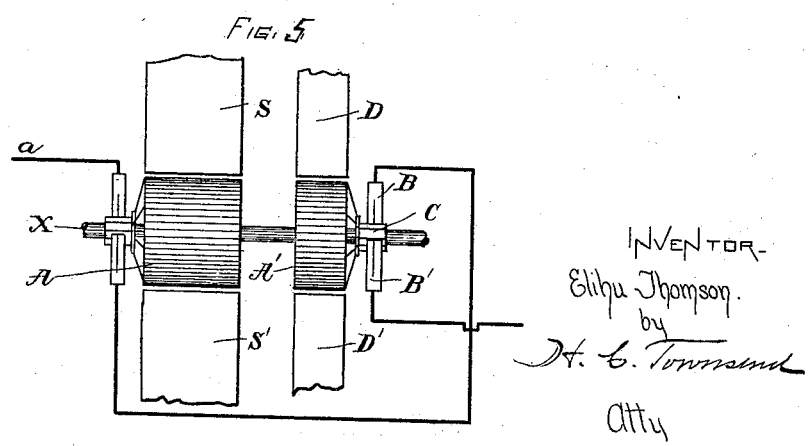
Witnesses—
A. F. Macdonald.
John W. Gibboney
Inventor—
Elihu Thomson.
by H. C. Townsend
Atty

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

ELECTRIC MOTOR.

SPECIFICATION forming part of Letters Patent No. 555,191, dated February 25, 1896.

Application filed December 19, 1890. Renewed October 22, 1894. Serial No. 526,566. (No model.)

*To all whom it may concern:*

Be it known that I, ELIHU THOMSON, a citizen of the United States, and a resident of Swampscott, in the county of Essex and State of Massachusetts, have invented a certain new and useful Electric Motor, of which the following is a specification.

My invention relates to the construction and manner of compounding or regulating electric motors run from main or supply wires of constant or approximately constant potential. Motors of this kind have frequently been made with a constant or approximately constant field excitation, dependent generally upon the magnetizing action of what is termed a "shunt field-coil" or one which is in a branch to the armature fed from the mains, which coil, being connected directly to the mains, carries a current of approximately constant amount. When the motor is thus provided with a constant field, there will be (unless the armature be extremely small in magnetic power as compared with the field) a certain falling off in the speed under heavy or increased load, amounting sometimes to a few per cent., which, however, may be made less or more, according to the proportioning.

In case it is desired that the motor shall be self-regulating as to speed under light and full load—that is, shall maintain an even and constant speed whether lightly or fully loaded, a condition not quite possible with the best forms of shunt-wound motors—it is necessary to compound the motor, or so affect the strength of the field magnetism that under load the magnetism shall be weaker, thereby diminishing the counter electromotive force of the armature and permitting more current to flow in the latter to increase the torque and bring the armature up to speed.

Heretofore the compounding or regulating action has been obtained by the application to the field-magnet of the machine of regulating-coils, which carry a current varying with the load and which act directly upon such field-magnet in opposition or in a contrary way to the shunt field-coils, or other magnetizing influence, in a manner to cut down the field magnetism, so that on an increase of the current flowing in the armature from one of the constant-potential mains or wires to the other, upon a loading which decreases the speed, the effect will be to cut down the magnetism and therefore the counter electromotive force of the motor, upon which it speeds up to produce the same counter electromotive force or nearly that force which it had before. Such regulating or compounding coils are usually, for the sake of simplicity and convenience, placed in the direct circuit with the armature, so as to carry current varying with the load or counter electromotive force, but might be coils in any circuit or deriving current from any source if the current in them be made, in any of the various ways known in the art, to carry the properly-varying current. In this way, indeed, the motor may be constructed so that it will not simply maintain constant speed during variations of load, but it may increase in speed with the load; but the great objection to this method of compounding the motor or regulating its speed is that should the motor be greatly overloaded or should it be subjected to sudden gush of an armature-current through any cause the chances are, in fact the probabilities are, the field magnetism will be reversed, or at least so far weakened that the motor will not turn at all, or will lose its torque, the field having been weakened to an extent far below that which gives it a torque under the conditions. In fact the sudden abnormal flow in the regulating-circuit in the machine may sometimes even reverse the magnetism of the field of the motor and tend to turn it in the other direction. This weakening of the field magnetism is also attended by a destructive burning and sparking at the commutator of the dynamo and with other irregularities not necessary to mention.

While I have described as a type of motor to which my invention is applicable one in which the field excitation is produced by shunt field-coils which are supplied from constant-potential mains, I do not wish to be understood as limiting myself in this respect, since the difficulties before mentioned would exist in whole or in part, however the normal field excitation is produced, whether from a separate exciting source of energy, from permanent magnetism, or by other connections of the principal coils of the machine, and my principal of construction for regulation or compounding is applicable to electric motors generally, though for the sake of simplicity I have described the invention as carried out in connection with a motor having its field normally excited from constant-potential mains.

My present invention consists in compounding or regulating the motor by action of a coil which carries current varying with the load, and instead of being applied to the same core as the main-field coil or that which produces a constant exciting influence is applied to a separate core, but acts upon the armature-conductors connected on the same or separate armature-cores in the proper manner to keep the speed of the machine constant by proper variation in the magnetic state or condition.

My invention consists further in giving to some portion of the magnetic circuit through which the separate coil might act to reverse the main field a restricted magnetic section or magnetic carrying capacity, so that the influence of the compounding-coil may not be so great as to overcome the effect of the magnetism of the main field or field-magnet of substantially constant power. Such restricted magnetic section or carrying capacity might be in the core of the regulating-coil itself, such core being in such case so small or so deficient in magnetic capacity as to be insufficient to overbalance the effect of the main or principal field, even if it (the core of the regulating-coil) be saturated; or in case a separate armature-core or portion of armature-core be used for the portion of coil or armature-coil upon which said regulating-magnet core acts, then the restricted section might exist in the said core or portion of core in such way as to prevent the influence of the regulating-coil from being carried to an amount overcoming the effect of the main field. The restricted magnetic section or carrying capacity might exist at any other point in the magnetic circuit through which the influence of the regulating-coil might operate.

My invention consists also in other features and modifications of the invention, as hereinafter more particularly described and claimed.

I have herein shown my invention as carried out in a machine in which one set of coils affecting the poles or magnet of fairly constant magnetism are in shunt to the armature, or connected directly across the main, while the other set of coils carrying the varying current and operating as another set of poles or field-magnet cores are in direct circuit with the armature. The latter poles and field-cores are also shown of very much smaller capacity, or, rather, much smaller section or magnetic carrying capacity, than the others, so that should they become saturated in the reverse direction they would not prevent the motor from still maintaining a torque, such as it normally possesses.

I have shown in the accompanying Figures 1 to 5 of the drawings ways of carrying the invention into practice.

In Fig. 1 we have a typical figure showing an electric motor fed by the mains $a\,b$, which may be of constant potential or nearly constant potential. The field-magnets or field-magnet poles which are presented to the armature are in this case four in number, two of which, constituting one set, are energized by the coils S S', which, as seen, are in shunt across the mains $a\,b$, while another set of field-poles much smaller in size and magnetic capacity, acting on a different longitudinal portion of the armature, are energized by the regulating-coils D D' in the main circuit of the motor-armature, the commutator of which is seen at C. X is the armature-shaft, A the armature, and B B' the commutator-brushes. The armature-core may, as shown, be divided into two separate portions, or, as seen in Fig. 4, may be upon one continuous core throughout the whole extent of the armature. The winding or direction of current-flow is opposite in the magnets D D' as compared with the magnetic coils S S'—that is, they produce opposite poles presented to the same side of the armature or to the same portions of the armature-winding between the commutator-brushes. Under a light load or a load which turns the motor only there will be but little current flowing in the coils D D', and the motor is then simply a motor revolving in the shunt-field provided by the coils S S', and it therefore maintains a certain speed, depending upon the strength of those poles. When a load is thrown upon the armature which tends to arrest its rotation, a current then flows in the main circuit-coils D D', which produces a counter electromotive force in the armature-windings or produces poles of opposite polarity to those produced by S S' on the same armature-wire. By the current passing in the coils D D', therefore, we have an opposing influence to the effect of the field produced by the current passing in the coils S S', which is equivalent to a differentiation of their power, though it is done through an entirely separate source, the opposing field tending to set up a counter electromotive force instead of an effect produced by mere weakening of the main fields S S', as in the ordinary case.

It is best to limit the size of the cores or magnetic carrying power of the cores D D', as compared with the cores upon which the coils S S' are wound, in such way that should the coils of the cores D D' be even saturated by the excessive flow of current, or receive their maximum magnetization, they would still be only a small fraction of the magnetic field of the machine, and therefore not reverse, in effect, the entire magnetic field of the motor. Thus it would be well to make the cores D D′ only, say, from ten to twenty per cent. of the section of the cores S S′ when fairly well magnetized; or, to put it in another way, the carrying capacity for magnetism, even at the maximum of the cores D D′, should be but a fraction of the effect which may be produced in the cores of the coils S S′ when in action. By this means, and by properly proportioning the effect of the windings, a compensation for a falling off in speed may be obtained in the motor, which will maintain its speed at the normal, even though the load may be varied from nothing to full load, and the result will be that the speed would increase under load in such a manner that should there be a decrease of speed in transmission from the motor to shafting, or through shafting to any driven machinery, the speed of the driven machinery would be maintained constant, while the motor is actually increased in speed under load. This might be called a "compounding" of the speed of the motor for load, as by its means an increase of, say, ten or fifteen per cent. of the motor under load, as compared with its speed under no load, is or can be readily obtained, and at the same time there is no danger of a very great overload reversing the magnetic conditions and upsetting the torque of the motor. A variable shunt may be placed around the direct-field circuit, and a variable resistance may be arranged to vary the relative strengths of either of the shunt field-coils, as usual with dynamos and motors, and as indicated.

A modification in the way of carrying my invention into effect is seen in Fig. 2. In this case the small magnet or the poles affected by the smaller-cored magnet are excited by two coils D S², the coil D being a coarse coil in circuit with the armature, as shown, through the brushes B B′, and the coil S² being in the shunt-circuit across the mains, either in circuit with the main shunt-coils S or in a separate shunt by themselves. The effect is that when both the coils S S² are doing work and no current is flowing in D, which is the condition under no load, there is so little current in the coil D that its effect is almost inappreciable, and both poles corresponding to these coils affect the armature in a like way or in the same direction to produce a counter electromotive force during the revolution of the armature A A′, but when the load is put on so that the current is passed through the coil D it opposes or differentiates the effect of the coil S², and under considerable load may even overcome it, so that a reversal of the magnetization of the core is produced and an effect produced similar to that in Fig. 1 at this stage. It is evident, however, that, since the smaller core or smaller field-pole is affected not only by a magnetization in the reverse direction to the main field pole or core, but also a differentiation from magnetization in the same direction, a much smaller accessory or differentiating magnet may be used in this case than in the case of Fig. 1 to produce equivalent results, as in this case the effective range is from magnetization by the coil S² to a considerable degree to magnetization in the opposite direction, overcoming the effect of the coil S² and producing a lowering of the counter electromotive force in the armature, which results in an increase in the speed under the conditions. It is obvious that the construction of Fig. 2 is the preferable one.

It will be readily seen that the main shunt-winding S, Fig. 2, might, of course, be carried around both sections of the field-pole, while the direct-circuit winding B is carried only over one portion of the field-pole—that is, a a single coil S might be made to inclose both portions of the field-cores and affect them in shunt—while the direct current only affected the smaller section, which will be alongside of it. This is one of the best constructions in fact for motors of this character.

I do not not limit myself to any particular arrangements of the field-poles with respect to each other and the armature, as it is obvious that many departures may be made or many changes made in this particular.

In Fig. 3 S S′ are the large poles affected by the shunt-winding, and D D′ the differential poles. The armature is of the ring pattern, divided as to its core into two sections, one of which is affected by one set of poles and the other by the other poles or winding by coupling to a commutator, as in the ordinary cases. Here the shunt-winding affects the cores or poles S S′, and the two windings D S² would be allowed to affect, as in Fig. 2, the smaller cores D D′. Fig. 4 only differs from this in having an armature A extending all the way through as one core and affected by the fields.

In Fig. 5 a further modification is shown, in which the armature itself is divided and the two parts or subdivisions are connected in series from $a$, through the commutator of the armature A, over to the commutator of the similar armature, whose brushes are marked B B′. The effect is the same, though the construction is more difficult and complicated and it requires two commutators. The windings of the armatures A A′ is of course to be made on a basis similar to that of the former armatures—that is, by winding it divided in such a way that an electromotive force in the armature A′, the smaller of the two, can never rise to a point to entirely overcome the effect in the armature A.

The arrangement of Fig. 5 is evidently similar to the coupling of two armatures up to run together by placing them on the same shaft, or by a rigid connection, or by a belt, and providing one with a shunt-field and the other with a differential field.

What I claim as my invention is—

1. The combination, in an electric motor, of a divided armature-core, two field-magnets acting respectively upon the two parts of the divided armature, and means for varying or changing the relative effects of said field-magnets in proper manner to restore the speed to normal.

2. The herein-described method of regulating for constancy of speed and increase of speed under load in electric motors, consisting in producing effective rotation by two field-magnets or portions of field-magnet, and two corresponding portions of motor-armature conductor connected, one portion of field-magnet having a restricted capacity, and decreasing the magnetism of the lesser or restricted portion on a decrease of speed.

3. The herein-described method of compounding an electric motor, consisting in maintaining a rotation by a derived circuit-coil or its equivalent as described, acting upon one part of the armature or armatures with a substantially constant effect, and applying at another part a regulating opposing influence incapable of overbalancing the effect of the main field magnetism.

4. The herein-described method of compounding in electric motors, consisting in establishing two motor-poles or sets of poles polarized in a direction such that they will conspire to produce rotation at light load, and reversing the polarity of one upon increase of load beyond a predetermined amount.

5. In an electric motor, the combination, substantially as described, of two sets of field-magnet poles, both normally polarized, so as to conspire to produce rotation, from cores of different capacity, the less core being constructed with reference to the desired capacity of regulation and an opposing coil applied to the core of less capacity, as and for the purpose described.

6. The combination in an electric motor, of an armature having a divided core, field-magnet poles of fairly constant strength located at one portion of said core, and variable or speed-regulating field-magnet poles located at the other portion of said core and incapable of overbalancing or overcoming the effect of the constant-field poles, as and for the purpose described.

7. In an electric motor, the combination with an armature having a divided core and having its conductor or conductors extended across from one of said divisions to the other, of two sets of field-magnets of different capacity located respectively at said divisions, as and for the purpose set forth.

8. The combination in an electric motor, of constant-field magnet-cores of large magnetic capacity, and differential-field magnet-cores of smaller magnetic capacity, and an armature with a divided core the separate divisions of which are affected respectively by said magnet-cores.

9. The combination in an electric motor, of two field-magnet cores or sets of cores one of less magnetic capacity than the other, a derived-circuit coil exciting both sets of cores, and an opposing main circuit-coil applied to the core of less capacity, as and for the purpose described.

10. The combination in an electric motor, of two or more sets of electromagnetic field-poles, one set having a comparatively constant magnetization, and another set of much smaller maximum magnetic capacity as compared with the first set and having its magnetism dependent upon the load on the motor, and opposite to that of the main fields under heavy load.

11. The combination with a revolving armature, having a divided core, of constant and variable field electromagnet-poles of different size at the different divisions of said core and applied to the same or connected armature-conductors.

12. The combination with an armature having a divided core and armature-conductors passing over both divisions thereof, of a constant-field electromagnet, and a smaller variable-field magnet acting respectively at said divisions upon the same portion of said conductor.

13. The combination, substantially as described, of two field-magnet cores of different size, producing a compound field for connected armature-conductors, field-coils S, S², wound on the larger and smaller cores respectively and carrying current of substantially constant amount, and a differential or regulating coil D, carrying current of variable amount and wound upon the smaller core.

14. The combination with an armature having a divided core, of a field-magnet having two sets of cores provided with poles of different width but of substantially the same circumferential extent and located respectively at the division of said armature, and arranged on the same line parallel to the axis of the armature, and means for differentiating the magnetic effects of said sets of cores.

15. A field-magnet having a set of field-magnet cores wound with fine wire, and a smaller variable or regulating set wound with coarser wire and arranged in the same line with the first parallel to the shaft of the machine, in combination with an armature having a divided core the divisions of which are located at the poles of the field and regulating magnets respectively.

16. The combination with an electric motor run from constant-potential wires and having a field-coil connected in a branch across said wires, of an armature having a divided core of which one division is located at said field-coil, and a compound coil wound on a separate core or support from the first and acting upon the other division of said armature, said second coil carrying current varying with the counter electromotive force of the motor-armature and being properly related or proportioned to the first to maintain the speed of the motor under changes of load.

17. The herein-described method of regulating an electric motor, run from a constant-potential circuit for differences of speed, which consists in varying its counter electromotive force by causing all its poles to conspire to produce a high counter electromotive force for a slow speed, and reversing the polarity of a part of said poles to produce a lower counter electromotive force for higher speed.

Signed at Lynn, in the county of Essex and State of Massachusetts, this 16th day of December, A. D. 1890.

ELIHU THOMSON.

Witnesses:
   JOHN W. GIBBONEY,
   WARREN B. LEWIS.